No. 737,797. PATENTED SEPT. 1, 1903.
H. S. WAINWRIGHT.
SPARK ARRESTER.
APPLICATION FILED OCT. 31, 1901. RENEWED AUG. 3, 1903.
NO MODEL. 5 SHEETS—SHEET 2.
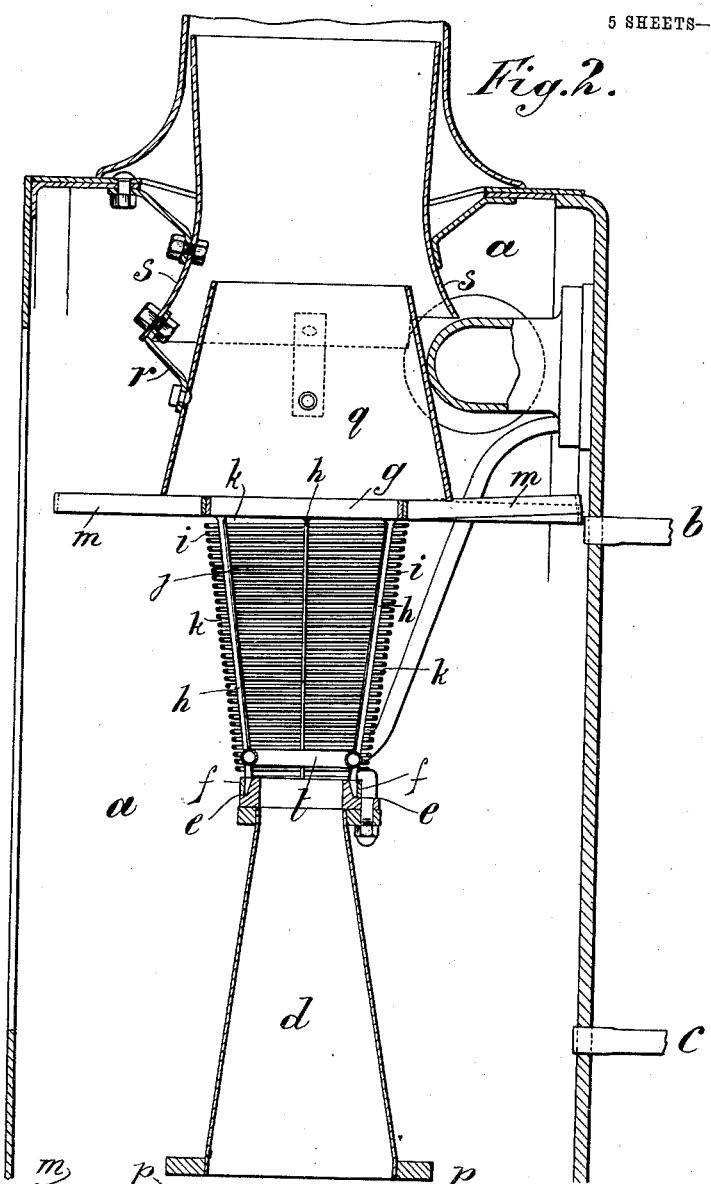
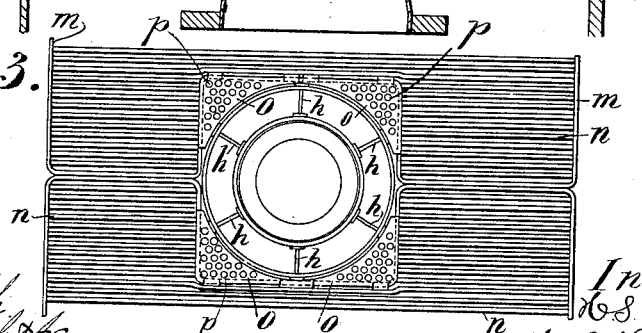

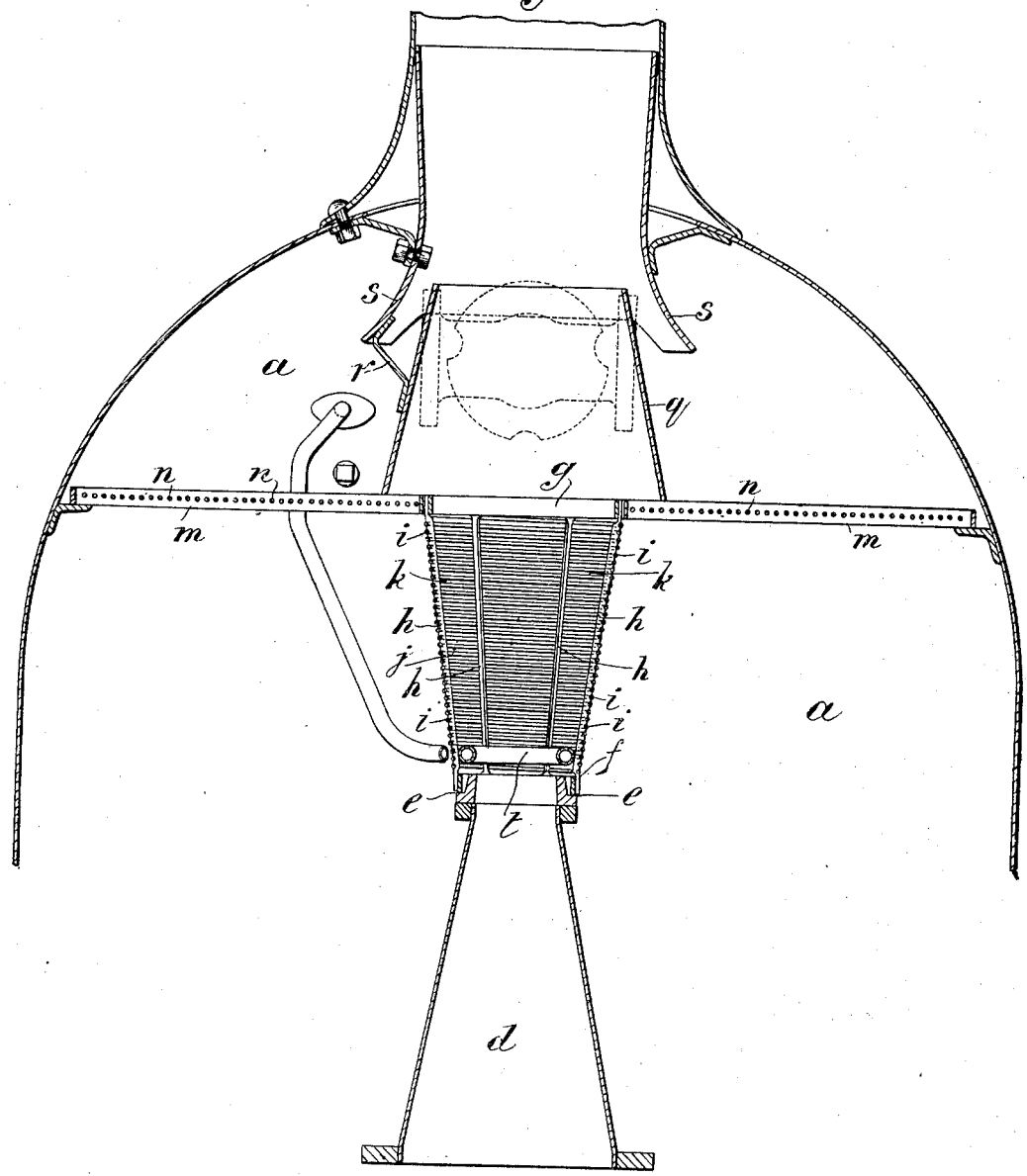

No. 737,797. PATENTED SEPT. 1, 1903.
H. S. WAINWRIGHT.
SPARK ARRESTER.
APPLICATION FILED OCT. 31, 1901. RENEWED AUG. 3, 1903.
NO MODEL. 5 SHEETS—SHEET 3.
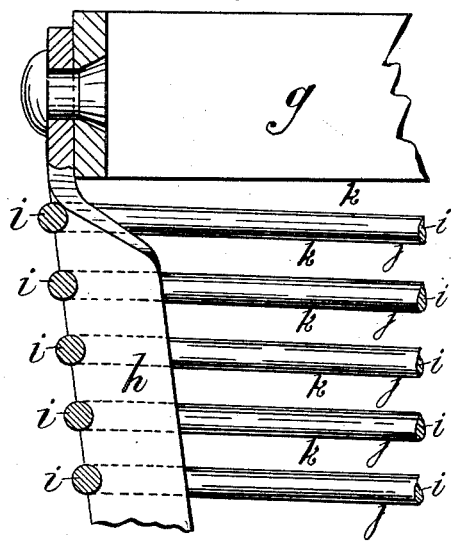
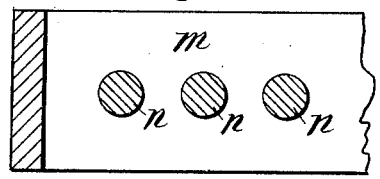
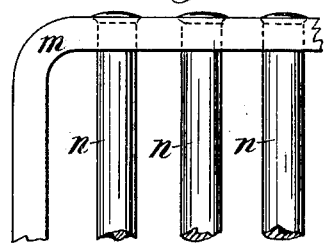
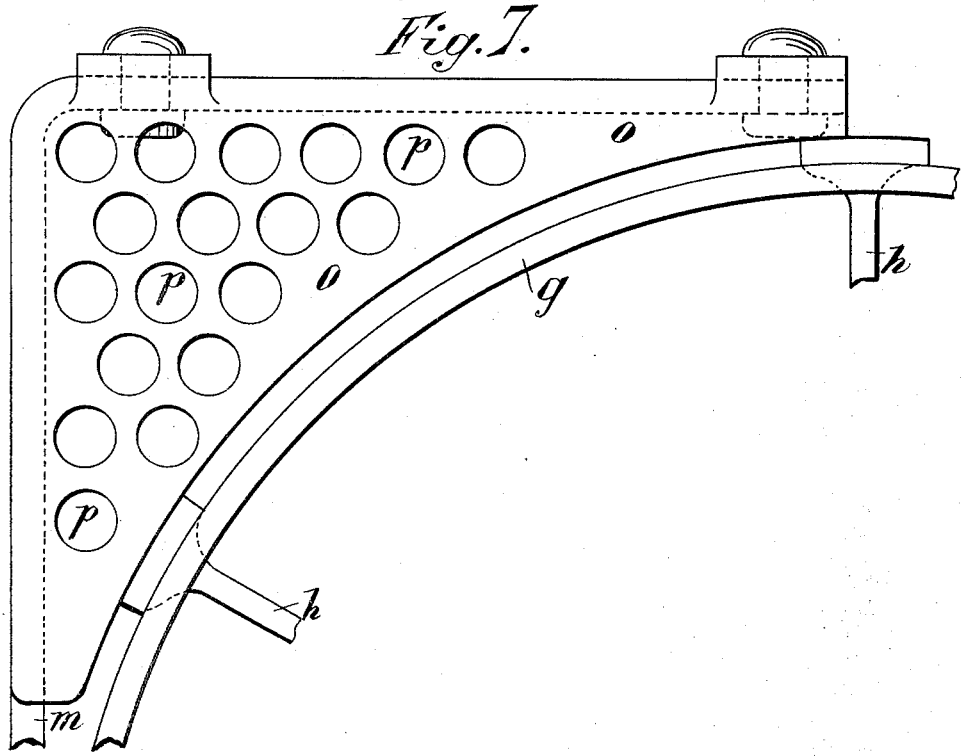
Witnesses
Geo E Trech
Chas R Wright Jr
Inventor
H S Wainwright,
by A S Pattison, atty.

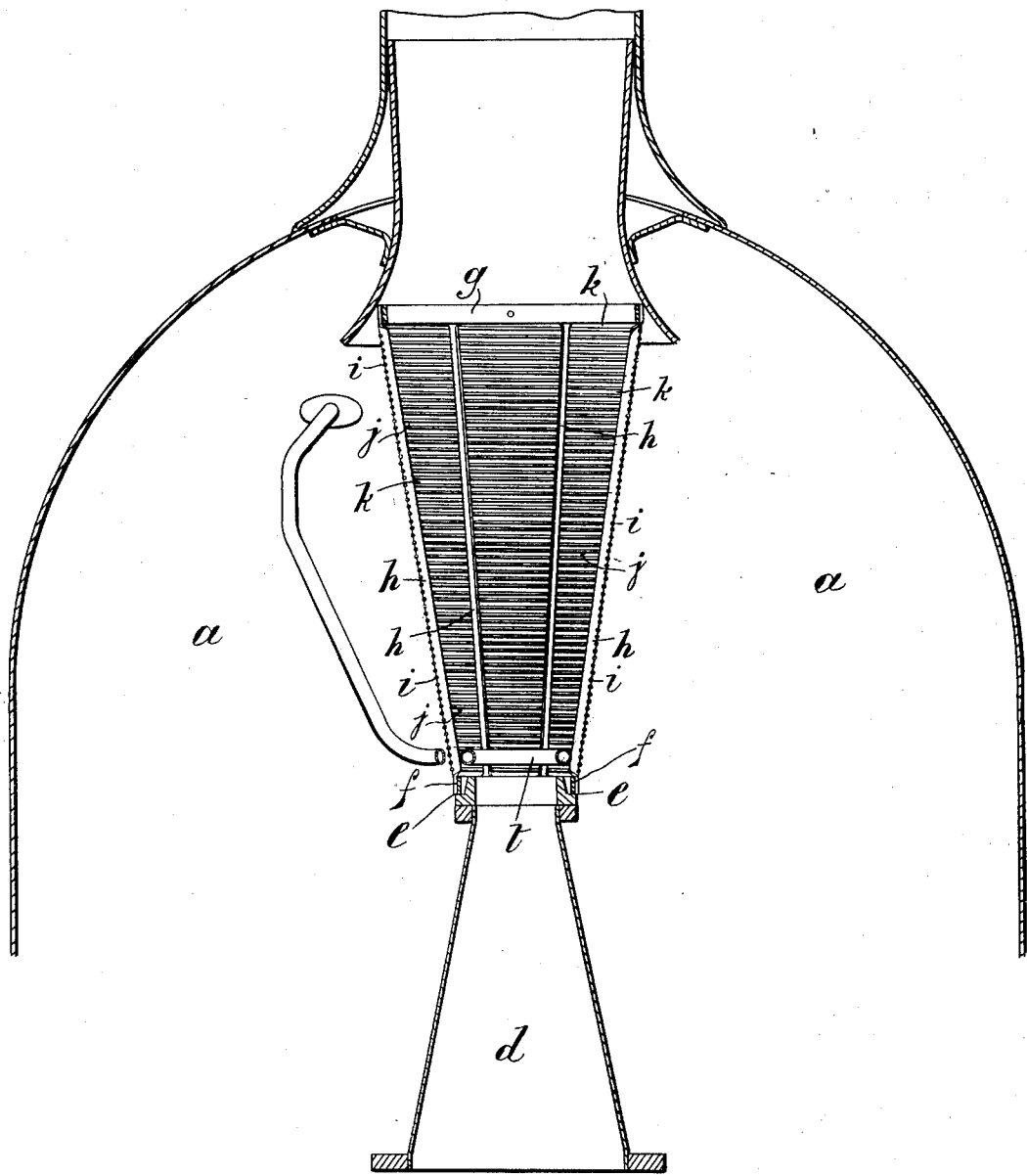

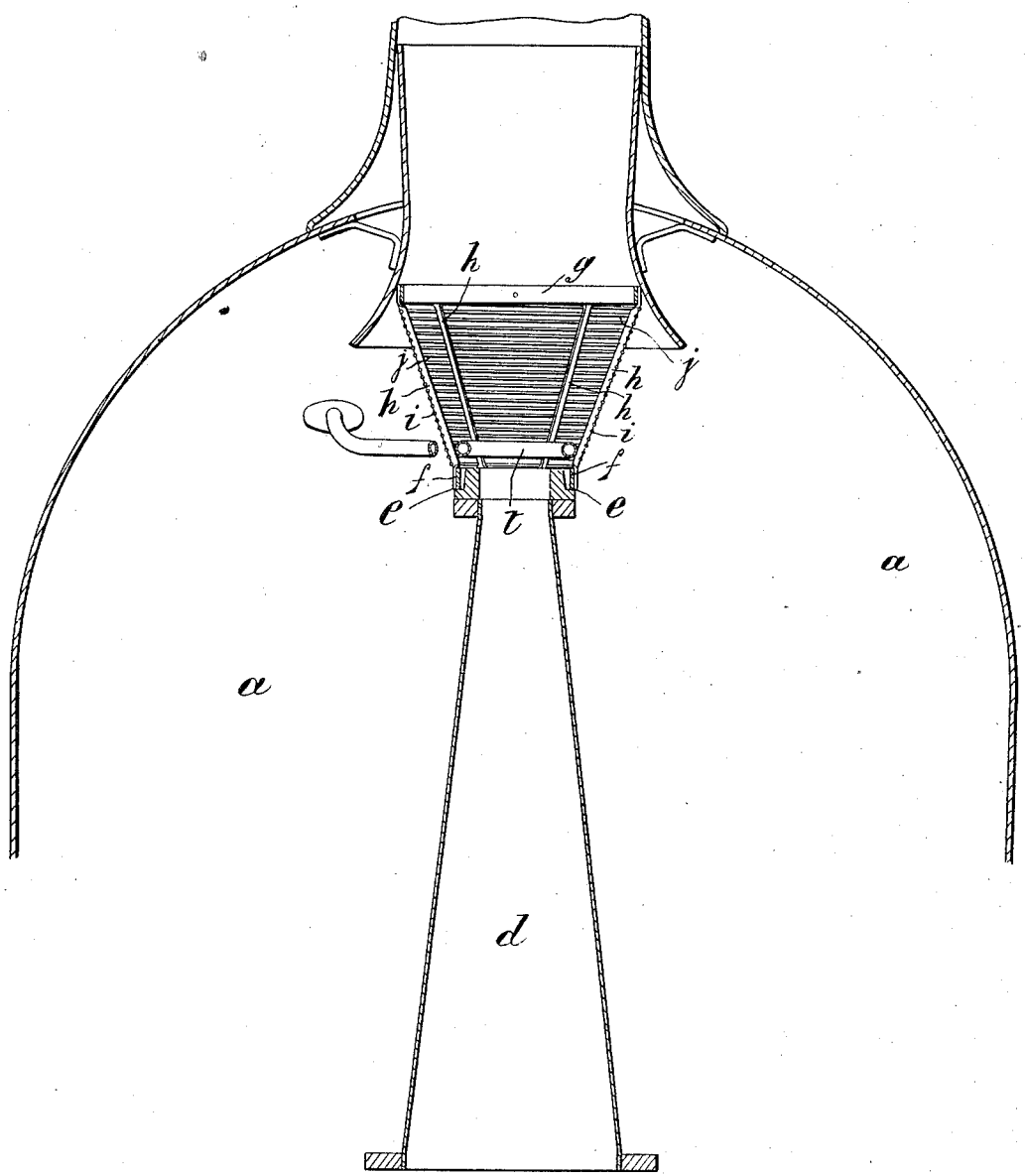

No. 737,797.

Patented September 1, 1903.

UNITED STATES PATENT OFFICE.

HARRY SMITH WAINWRIGHT, OF ASHFORD, ENGLAND.

SPARK-ARRESTER.

SPECIFICATION forming part of Letters Patent No. 737,797, dated September 1, 1903.

Application filed October 31, 1901. Renewed August 3, 1903. Serial No. 168,122. (No model.)

*To all whom it may concern:*

Be it known that I, HARRY SMITH WAINWRIGHT, a subject of the King of Great Britain and Ireland, residing at Ashford, in the county of Kent, England, have invented Improvements in Spark-Arresters, of which the following is a specification.

This invention has for its object to arrest the discharge of sparks or glowing particles from locomotives, and more particularly from those having short blast-pipes.

That the use in locomotives of a short blast-pipe effects considerable economy in coal consumption is well understood, but is subject to the disadvantage that it causes the ejection of sparks in large quantities. Attempts have hitherto been made to overcome this difficulty by providing in the smoke-box above the level of the tubes a transverse grid or perforated plate similar in character to that used with long blast-pipes and extending right across the smoke-box. Sometimes such plate or grid has been provided with a larger perforation or hole directly over the orifice of the blast-pipe; but with such an arrangement, unless with a very large central hole, considerable baffling of the steam has been found to result, while with a very large central hole the ejection of sparks has not been found to be effectually prevented. The last-mentioned objection applies equally to an arrangement which has been proposed in which a kind of open-work metal basket having the form of an inverted hollow truncated zone is mounted on the blast-pipe and extends therefrom to the funnel just within the lower part of which the largest diameter of the basket is located, the openings between the rods or wires of which the basket is composed being larger and larger as the top of the basket is approached.

Now according to the present invention there is provided in the smoke-box an arrangement comprising a blast-pipe and a tube-like guard constructed with openings between which are surfaces having a slight upward inclination intended to aid in arresting and throwing down sparks. A construction of said guard which I deem advantageous comprises an upper ring, a lower ring, bars which connect these rings, and a metal wire or rod openly wound spirally around the said connecting-bars in such a manner as to leave spaces for passage of smoke and gases, but to arrest sparks or glowing particles. I consider it advantageous to make said guard of truncated conical form and to arrange it with the largest diameter uppermost, the lower end resting on an annular shoulder formed on the exterior of the blast-pipe. The upper end can be fitted within an aperture formed in a horizontal grid fixed within the smoke-box above the level of the fire-tubes of the boiler. Sometimes said grid may be dispensed with, in which case the upper end of the guard is located within the base of the chimney.

Of the accompanying illustrative drawings, Figure 1 shows in transverse vertical section so much of the smoke-box of a locomotive-engine with accessories as is needful to illustrate my invention, the section being taken in the plane of the center. Fig. 2 shows a vertical section in a plane at right angles to that of Fig. 1. Fig. 3 shows a plan of the framework of the guard, the perforated corner-plates which immediately surround the upper part of the guard, and part of the horizontal grid. Fig. 4 shows to a larger scale (a convenient full size) a small part of the upper portion of the guard. Figs. 5 and 6 show to a like scale (a convenient full size) a small part of the horizontal grid. Fig. 7 shows (to same scale as Figs. 4, 5, 6) a plan of one of the corner perforated plates forming part of grid. Fig. 8 is a corresponding view to Fig. 1 of a modification wherein while retaining the short blast-pipe the grid is dispensed with. Fig. 9 is a like view of a modification constructed with a long blast-pipe.

The same reference-letters are employed to denote like parts in each modification.

Referring now to Figs. 1 to 7, inclusive, $a$ is the smoke-box, $b$ indicates the level of the uppermost fire-tubes, $c$ that of the lowermost fire-tubes. $d$ is the blast-pipe. It is a short one, which is advantageous for the reason already set forth. $e$ is a shoulder which surrounds the discharge-orifice of the blast-pipe. This shoulder receives the lower part of the guard which in the example illustrated is constructed as follows:

$f$ is a lower ring, $g$ an upper ring, and $h\ h\ h\ h\ h$ are bars attached at their lower ends to the lower ring and at their upper ends to the upper ring. Each of these bars is formed at its outer edge with notches or recesses wherein is located a thick wire or rod *i*, which is connected at its lower end to the lower ring and at its upper end to the upper ring and spirally surrounds the framework constituted, as aforesaid, by said bars *h*, the notches of which keep the said wire or rod *i* in position spirally around the framework, thus forming a guard whereof the spaces *k* between the bars *h* and wire or rod *i* and between same and the upper and lower rings constitute openings such as are found to permit adequately free outflow of gases to act efficiently in preventing ejection of sparks or glowing particles, (which the inclined under surfaces *j* of the several turns of the spiral wire or rod *i* tend to arrest and throw down,) and this without unduly baffling the steam.

Across the fire-box is a grid composed partly of framing *m* and bars *n* and partly of plates *o*, with perforations *p*. As will be seen, said grid is located just above the level of the highest fire-tubes, (indicated at *b*.) It is horizontal or approximately horizontal and extends across the fire-box, but not over the tube-like guard, whose upper end terminates at the grid-level and fits loosely in an aperture in the grid. The tube-like guard may be attached to the grid or merely fit therein, and may, if desired, extend upward beyond the top of the grid. Immediately above the said grid is a petticoat *q*, connected by brackets *r* to the base *s* of the funnel.

*t* is the blower.

When the horizontal grid is dispensed with, it is advantageous to extend the guard up to the base of the chimney. Such an arrangement may be adopted either with a short blast-pipe, as in the example represented in Fig. 8, or with a long blast-pipe, as in the example illustrated in Fig. 9.

What I claim is—

1. A spark-arrester comprising a framework composed of a lower ring, an upper ring, bars formed with notches or recesses in their outer edges and attached at their lower ends to said lower ring and at their upper ends to said upper ring, and wire or rod wound spirally around said framework and within said notches or recesses whereby said wire or rod is retained in place, said upper ring being of greater diameter than said lower ring and said arrester gradually and continuously increasing in diameter from said lower ring to said upper ring.

2. In a locomotive, the combination of a blast-pipe formed or provided near its upper end with an external annular shoulder, and a spark-arrester comprising a framework composed of a lower ring, fitting around said blast-pipe and resting on said shoulder, an upper ring, bars attached at their lower ends to said lower ring and at their upper ends to said upper ring, and wire or rod wound spirally around said framework and connected to said framework so as to be retained in place thereon.

3. In a locomotive, the combination of a blast-pipe formed or provided near its upper end with an external annular shoulder, and a spark-arrester comprising a framework composed of a lower ring fitting around said blast-pipe and resting on said shoulder, an upper ring, bars formed with notches or recesses in their outer edges and attached at their lower ends to said lower ring and at their upper ends to said upper ring, and wire or rod wound spirally around said framework and within said notches or recesses whereby said wire or bar is retained in place.

4. In a locomotive the combination of a blast-pipe formed or provided near its upper end with an external annular shoulder, and a spark-arrester comprising a framework composed of a lower ring fitting around said blast-pipe and resting on said annular shoulder, an upper ring, bars formed with notches or recesses in their outer edges and attached at their lower ends to said lower ring and at their upper ends to said upper ring, and wire or rod of circular cross-section wound spirally around said framework and within said notches or recesses and secured to said framework whereby said wire or bar is retained in place, said upper ring being of greater diameter than said lower ring and said arrester gradually and continuously increasing in diameter from said lower ring to said upper ring, substantially as described.

5. In a locomotive, the combination of a blast-pipe formed or provided near its upper end with an external annular shoulder, a horizontal or approximately horizontal grid provided with an aperture, and a spark-arrester comprising a framework composed of a lower ring fitting around said blast-pipe and resting on said shoulder, an upper ring, bars attached at their lower ends to said lower ring and at their upper ends to said upper ring, and wire or rod wound spirally around said framework, said spark-arrester extending from said shoulder to said grid and fitting loosely in said opening thereof.

6. In a locomotive, the combination of a blast-pipe formed or provided near its upper end with an external annular shoulder, a horizontal or approximately horizontal grid provided with an aperture, and a spark-arrester comprising a framework composed of a lower ring fitting around said blast-pipe and resting on said shoulder, an upper ring, bars formed with notches or recesses in their outer edges and attached at their lower ends to said lower ring and at their upper ends to said upper ring, and wire or rod wound spirally around said framework and within said notches or recesses whereby said wire or bar is retained in place, said spark-arrester extending from said shoulder to said grid and fitting loosely in said aperture.

7. In a locomotive, the combination of a blast-pipe formed or provided near its upper end with an external annular shoulder, a horizontal or approximately horizontal grid provided with an aperture, and a spark-arrester comprising a framework composed of a lower ring fitting around the upper part of said blast-pipe and resting on said shoulder, an upper ring, bars formed with notches or recesses in their outer edges and attached at their lower ends to said lower ring and at their upper ends to said upper ring, and wire or rod of circular cross-section wound spirally around said framework and within said notches or recesses and secured to said framework whereby said wire or rod is retained in place spirally, said upper ring being of greater diameter than said lower ring and said spark-arrester extending from said shoulder to said grid and fitting loosely in said aperture, and gradually and continuously increasing in diameter from said lower ring to said upper ring, substantially as described.

8. In a locomotive, the combination of a short blast-pipe, a spark-arrester of gradually and continuously increasing diameter and comprising a framework composed of a lower ring, an upper ring, bars formed with notches or recesses in their outer edges, and attached at their lower ends to said lower ring and at their upper ends to said upper ring, and wire or rod wound spirally around said framework and within said notches or recesses, whereby said wire or rod is retained in place, a horizontal or approximately horizontal grid, said spark-arrester extending from said blast-pipe to said grid, and a petticoat located immediately above said grid.

9. In a locomotive, the combination of a short blast-pipe formed or provided near its upper end with an annular external shoulder, a spark-arrester comprising a framework composed of a lower ring fitting around the upper part of the blast-pipe and resting on said shoulder, an upper ring, bars formed with notches or recesses in their upper edges and attached at their lower ends to said lower ring and at their upper ends to said upper ring, and wire or rod of circular cross-section wound spirally around said framework and within said notches or recesses and secured to said framework, whereby said wire or bar is retained in place spirally, a horizontal or approximately horizontal grid, provided with an aperture said spark-arrester extending from said shoulder to said grid and fitting loosely in said aperture, and a petticoat located immediately above said grid, substantially as described.

Signed at 77 Cornhill, London, England, this 15th day of October, 1901.

HARRY SMITH WAINWRIGHT.

Witnesses:
 PERCY E. MATTOCKS,
 EDMUND S. SNEWIN.